Feb. 21, 1939.  W. F. GROENE ET AL  2,148,350
CRANKSHAFT CHUCK
Filed April 7, 1938  2 Sheets-Sheet 1
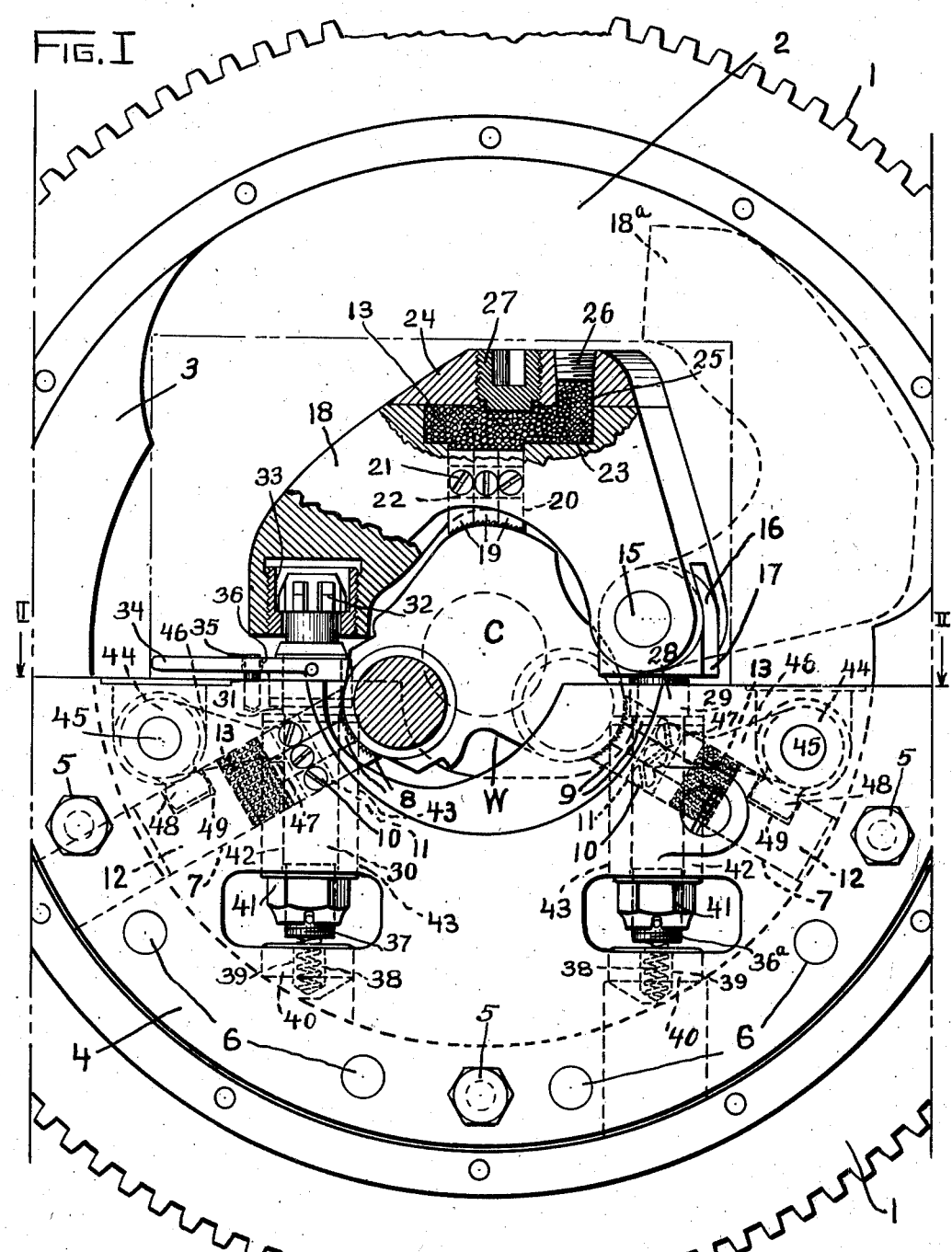
FIG. I
WITNESS.
Elmer R. Shipley
INVENTORS.
WILLIAM F. GROENE
WALTER R. MEYER
BY Willard S. Groene
ATTORNEY.

Feb. 21, 1939.   W. F. GROENE ET AL   2,148,350
CRANKSHAFT CHUCK
Filed April 7, 1938   2 Sheets-Sheet 2
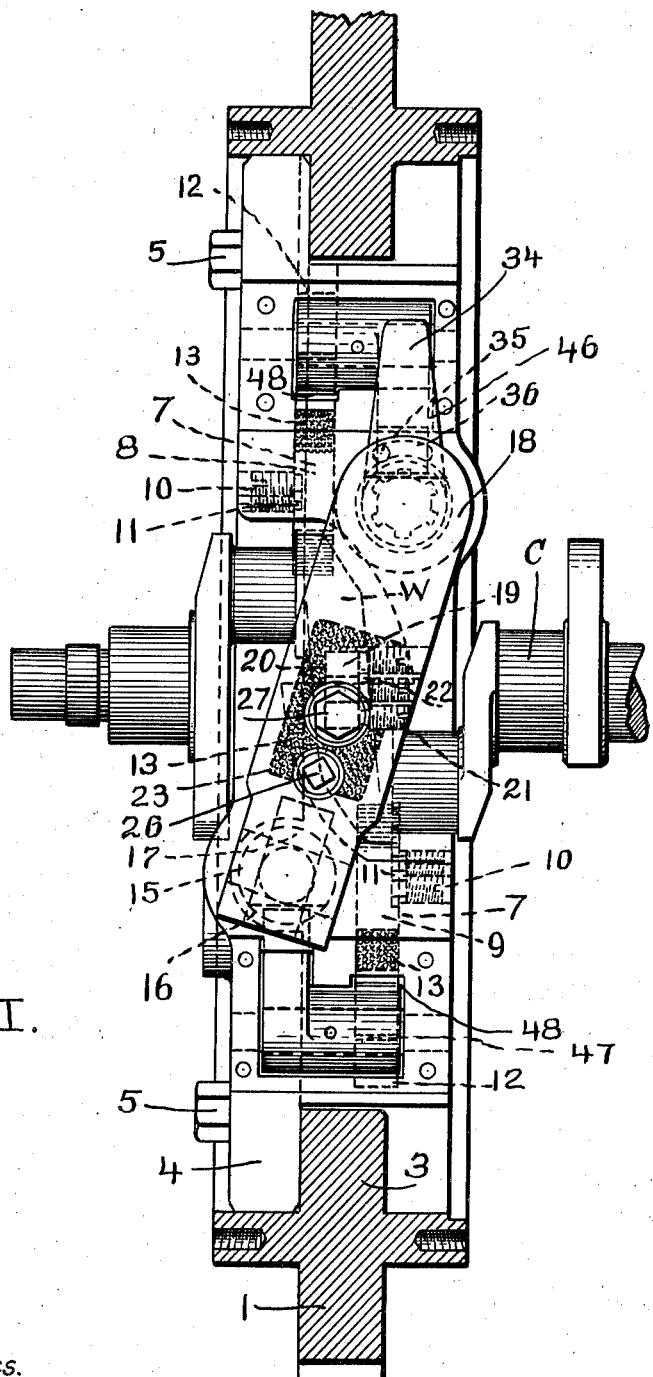
FIG. II.
WITNESS.
Elmer R. Shipley.
INVENTORS.
WILLIAM F. GROENE
WALTER R. MEYER
BY Willard S. Groene
ATTORNEY.

Patented Feb. 21, 1939

2,148,350

UNITED STATES PATENT OFFICE 2,148,350

CRANKSHAFT CHUCK

William F. Groene and Walter R. Meyer, Cincinnati, Ohio, assignors to The R. K. Le Blond Machine Tool Company, Cincinnati, Ohio, a corporation of Delaware Application April 7, 1938, Serial No. 200,696

6 Claims. (Cl. 82—40)

This invention pertains to chucks for gripping irregular rough-surfaced work pieces which have been properly prelocated with respect to the axis of rotation of the chuck. More particularly this invention pertains to certain specific improvements in chucks of a character shown in copending application Serial Number 167,613 filed October 6, 1937.

The chief object of this invention is to provide improved means for interconnecting the plungers in the chuck body with the movable clamping member.

Another object is to provide bell cranks for interconnecting the movements of the plungers in the chuck body with the movement of the clamping member.

Further objects will appear from a description of the drawings, in which:

Figure I is an axial view of a center drive ring gear chuck embodying the features of this invention.

Figure II is a transverse section on the line II—II through the chuck of Figure I.

As an exemplary disclosure we show our invention applied to a ring gear 1 of a center drive work spindle having an axial bore 2 through which may be axially loaded a work piece or crankshaft C into or out of the ring gear 1.

To the inner web 3 formed integral with the ring gear 1 is fixed the frame 4 by suitable screws 6 and dowel pins 6. Slidably mounted in appropriate slots 7 are two series of compensating plungers 8 and 9 adapted to move substantially radially of the axis rotation of the chuck. Retaining screws 10 threaded in frame 4 and entering the slots 11 in each of the plungers 8 and 9 serve to retain them in the frame 4 while at the same time providing ample freedom of movement of the plungers to allow their outer end to properly engage the rough irregular surfaces of the periphery of the web W of the crankshaft C. Behind the plungers 8 and 9 are chambers formed by the slot 7 and the plungers 12 slidably fitting in said slots behind the plungers. Between the plungers 8 and 9 and the plungers 12 is placed a compensating pressure receiving medium such as a hydraulic fluid, a semi-liquid, or metallic balls or shot 13 as shown in this exemplary embodiment, so that said medium 13 is aligned between the plungers 8 and 9 and the plungers 12.

On the pin 15 fixed to the head 16 of an eye-bolt 17 is pivotally mounted the clamp 18, which has the series of compensating plungers 19 slidably mounted in a suitable slot 20 formed in the clamp for movement substantially radially of the axis of rotation of the chuck. Retaining screws 21 threaded in the clamp 18 and entering the slots 22 in each of the plungers 19 serve to retain them in the clamp while at the same time providing ample freedom of movement of the plungers to allow their ends to properly engage the web W of the crankshaft C. A chamber is formed behind these plungers 19 by the slot 20 and the cavity 23 in the clamp 18. A plate 24 is welded over the cavity 23 to complete the chamber behind the plungers which contains a compensating pressure receiving medium 13 similar to that utilized in the chambers behind the plungers 8 and 9. In the plate 24 is provided a passageway 25 for insertion of the medium in the cavity 23, the passageway being normally closed by the pipe plug 26. Also threaded in the plate 24 is the clamping screw 27 which projects into the cavity 23 and engages the medium therein so that when the screw 27 is screwed down against the medium 13 the plungers 19 will be thrust outwardly (or downwardly in Fig. I) to force them in engagement with the web W of the crankshaft C.

The eye-bolt 17 is pivotally and slidably mounted on its stem 28 in a suitable bore 29 formed in the frame 4 so that the pivot pin 15 and the clamp may have movement up and down as shown in Figure I. The pivotal mounting of the eye-bolt 17 also permits sidewise swinging of the clamp 18 to facilitate loading and unloading the work in the chuck.

The clamp 18 is held in position when swung over the work by a latch comprising a latch bolt 30 which is pivotally and slidably mounted in a suitable bore 31 formed in the frame 4. The upper end of the bolt 30 is provided with an enlarged splined end 32 which enters a female splined socket 33 fixed to clamp 18 when the clamp is swung over the work. When the bolt is rotated partially the proper amount, the splined end 32 will not pass back through the splined portion 33 because these portions under these conditions are not aligned. The clamp will thus be held from swinging upward away from the work C when the clamping screw 27 is tightened. A suitable operating handle 34 fixed on the bolt 30 is provided for rotating it to clamping or unclamping position, a pin 35 fixed at the frame 4 and operating in a slot 36 formed in the handle 34 serving to locate these positions for the handle and bolt 30.

The lower end 36a of the stem 28 and the eye-bolt 17 and the lower end 37 of the latch bolt 30 are each supported on compression coil springs 38 mounted in bores 39 in plug 40 fixed in the frame 4, the purpose of which arrangement is yieldingly upwardly urge the clamp 18 when swung over the work to prevent the clamp 18 from resting on the crankshaft C so as not to deflect the crankshaft downwardly through prelocated position during the clamping of the work chuck.

Mounted adjacent to these downward extensions of the eye-bolt 17 of the latch bolt 39 are lock nuts 41 which supports the bushings 42 adapted to slide freely in the counterbores 43 formed in the frame 4 when the eye-bolt and latch bolt are moved up and down.

The bushings 42 are interconnected for simultaneous movement with the plungers 12 by means of the bell cranks 44 which are pivotally mounted on pins 45 fixed in the frame 4 and which bell cranks have projecting arms 46 which engage in appropriate slots 47 formed in the bushings 42 and which bell cranks also have projecting arms 48 which engage in slots 49 formed in the plungers 12. Thus when the eye-bolt and latch bolt are moved upwardly (Fig. I) the bushing 42 by actuating the bell crank 44 will force the plungers 12 radially toward the axis of rotation of the chuck and through the medium 13 will likewise urge the gripping plungers 8 and 9 axially toward the axis of rotation of the chuck for engaging the web W of the crankshaft C.

In operating the chuck the clamp 18 is swung back away from the work to a position indicated at 18a so that work C may be easily passed into the chuck. The work C is then located in proper centered and index position in the lathe by means other than the chuck such as the tailstock center pin of the lathe. The clamp 18 is then swung downwardly over the work and the lever 34 is moved to latch the clamp in this position. Under these conditions the weight of the clamp is supported on the springs 38 so that it does not rest upon the work piece C. The plungers 19 do, however, rest lightly in the web W. The bushings 42 are in their downward position so that the plungers 8 and 9 are slightly withdrawn from the work or are free to be moved backward from the work when the work is placed in the lathe.

The clamp screw 27 is then firmly tightened down which forces the plungers 19 towards the work which causes the clamp 18 to be raised with the assistance of the spring 38. This movement also raises the eye-bolt and latch bolt which in turn causes the plungers 8 and 9 through the medium of the bell crank to move towards and engage the web W of the crankshaft C. Final tightening of the screw 27 will thus cause all of the plungers 8 and 9 to engage the work with equal pressure through the equalizing and interlocking mechanism here set forth.

Having fully set forth and described my invention, what I claim as new and desire to secure by United States Letters Patent is:—

1. In a chuck, a rotatable chuck body, means to one side of the axis of said chuck to engage a prelocated work piece by means of rough irregular surfaces thereof, a clamp on said chuck body to the other side of said axis from said work engaging means said body movable relative thereto, means movable in said clamp for engaging said work piece, interconnecting means between said clamp and said first mentioned work engaging means incorporating a bell crank lever to limit the bodily movement of said clamp when said work engaging means in said clamp is moved against said workpiece.

2. In a chuck, a rotatable chuck body, a frame fixed to said chuck body, compensating work engaging plungers mounted in said frame, chambers in said frame behind said plungers, a clamp pivotally mounted on an eye-bolt which is pivotally and slidably mounted in said frame, said clamp being adapted to be swung over a work piece in the chuck or to be swung back away from said work piece for unloading said chuck, a latch movably mounted in said frame for holding said clamp in position when swung over said work piece, means for engaging and disengaging said latch from said clamp, means engaging said work piece tending to force said clamp away from said compensating plungers when said chuck is being applied to the work, and bell cranks interconnecting said eye-bolt and said latch with said compensating plungers whereby the movement of said clamp is defined by the movement of said compensating plungers.

3. In a chuck, a rotatable chuck body, a frame fixed to said body, a pair of angularly related compensating work engaging plungers mounted in said frame, chambers in said frame behind said plungers, a clamp movably mounted on a pivot and a latch relative to said frame, bushings on said pivot and latch, bell cranks pivotally mounted in said frame and connected to said bushing, plungers in said chambers behind said angularly related work engaging plungers and connected to said bell cranks, a compensating pressure receiving medium in said chambers, said bell cranks serving to interconnect said clamp with said chambers whereby movement of said clamp is determined by the movement of said angularly related work engaging plungers.

4. In a chuck, a rotatable chuck body, work engaging plungers mounted in said chuck body to one side of the axis of said chuck, chambers containing a compensating pressure receiving medium behind said plungers, a clamp mounted on the other side of said axis for movement bodily relative to said axis, work engaging plungers mounted in said clamp, a chamber containing a compensating pressure receiving medium behind said last mentioned plungers, bell cranks connecting said clamp to the medium in said first mentioned chambers whereby the position of said clamp relative to a work piece in the chuck is determined by the position assumed by the plungers when pressure is applied to the medium in said second mentioned chamber.

5. In a chuck, a rotatable chuck body, work engaging plungers mounted in said chuck body to one side of the axis of rotation of said chuck, chambers containing a compensating pressure receiving medium behind said plungers, a clamp pivotally mounted on the other side of said axis, a latch means associated with said clamp, work engaging plungers mounted in said clamp, a chamber containing a compensating pressure receiving medium behind said last mentioned plungers, said pivotal mounting, and said latch, means associated with said clamp being floatingly mounted on said chuck body and interconnected by bell cranks with said first mentioned chambers, and means in said clamp for applying pressure to said second mentioned member.

6. In a chuck, a rotatable chuck body, angularly related work engaging plungers mounted in said body to one side of the axis of rotation of said chuck, chambers formed in said chuck body behind said plungers, a second series of plungers in said chambers adapted to move parallel with said first mentioned plungers, pressure receiving medium between both of said sets of plungers, a clamp pivotally mounted on the other side of said axis, a latch means associated with said clamp, work engaging plungers mounted in said clamp, a chamber containing a compensating pressure receiving medium behind said last mentioned plungers, said pivotal mounting and said latch means being interconnected with bell cranks, said bell cranks being pivotally mounted in said chuck body and interconnected with the plungers behind said angularly related work engaging plungers, and means for applying pressure to the chamber in said clamp to cause movement of all of said work engaging plungers against a work piece in said chuck.

WILLIAM F. GROENE.
WALTER R. MEYER.